United States Patent
Matsubayashi et al.

(10) Patent No.: US 8,268,219 B2
(45) Date of Patent: *Sep. 18, 2012

(54) METHOD OF RESIN SEALING PERMANENT MAGNETS IN LAMINATED ROTOR CORE

(75) Inventors: Satoshi Matsubayashi, Kitakyushu (JP); Hirotoshi Mabu, Kitakyushu (JP); Katsumi Amano, Kitakyushu (JP); Atsushi Shiraishi, Kitakyushu (JP)

(73) Assignee: Mitsui High-Tec, Inc., Kitakyushu-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/012,270

(22) Filed: Jan. 24, 2011

(65) Prior Publication Data

US 2011/0115126 A1 May 19, 2011

Related U.S. Application Data

(63) Continuation of application No. 10/584,922, filed as application No. PCT/JP2006/300910 on Jan. 16, 2006, now Pat. No. 7,897,089.

(30) Foreign Application Priority Data

Jan. 24, 2005 (JP) ................................. 2005-015860

(51) Int. Cl.
*B29C 45/14* (2006.01)
(52) U.S. Cl. ..................................... 264/279; 264/272.2
(58) Field of Classification Search .................. 264/279, 264/272.2
See application file for complete search history.

(56) References Cited

U.S. PATENT DOCUMENTS

| 4,386,898 A | 6/1983 | Sera |
| 4,511,317 A * | 4/1985 | Bandoh .................. 425/116 |
| 4,910,861 A | 3/1990 | Dohogne |
| 5,435,953 A | 7/1995 | Osada et al. |

(Continued)

FOREIGN PATENT DOCUMENTS

EP 1536543 A1 6/2005

(Continued)

OTHER PUBLICATIONS

Supplementary European Search Report dated Apr. 19, 2011, issued in corresponding European Patent Application No. 06700932.4.

(Continued)

*Primary Examiner* — Joseph Del Sole
*Assistant Examiner* — Kimberly A Stewart
(74) *Attorney, Agent, or Firm* — Westerman, Hattori, Daniels & Adrian, LLP

(57) ABSTRACT

A laminated rotor core (36) wherein permanent magnets (47) are inserted in respective magnet insertion holes (46) is disposed between and pressed by an upper die (37) and a lower die (29). The upper die (37) has resin reservoir pots (50) provided above the laminated rotor core (36) and at positions corresponding to the respective magnet insertion holes (46). Raw resin material put in the resin reservoir pots (50) is heated by the upper die (37). Subsequently, the resin material in a liquefied state is ejected from the resin reservoir pots (50) by plungers (52) that are inserted and moves vertically in the resin reservoir pots (50) and is directly filled in the magnet insertion holes (46). Consequently, the respective magnet insertion holes (46) are filled with the resin material more evenly and highly reliable products can be supplied at low cost.

6 Claims, 8 Drawing Sheets

U.S. PATENT DOCUMENTS

| | | | |
|---|---|---|---|
| 5,527,173 | A | 6/1996 | Miller et al. |
| 6,724,072 | B2 * | 4/2004 | Ochiai et al. .......... 257/667 |
| 7,653,984 | B2 | 2/2010 | Amano et al. |
| 2003/0030186 | A1 | 2/2003 | Riiska et al. |
| 2005/0225190 | A1 | 10/2005 | Kinashi et al. |
| 2006/0103253 | A1 | 5/2006 | Shiga et al. |
| 2008/0277825 | A1 | 11/2008 | Venrooij |
| 2010/0083486 | A1 | 4/2010 | Amano et al. |

FOREIGN PATENT DOCUMENTS

| | | | |
|---|---|---|---|
| JP | 55-23707 | A | 2/1980 |
| JP | 3-50941 | U | 5/1991 |
| JP | 5-236713 | A | 9/1993 |
| JP | 2526143 | Y2 | 2/1997 |
| JP | 2527656 | Y2 | 3/1997 |
| JP | 11-106982 | A | 4/1999 |
| JP | 2001-157394 | A | 6/2001 |
| JP | 2002-34187 | A | 1/2002 |
| JP | 2004-312871 | A | 11/2004 |
| WO | 2005/120799 | A1 | 12/2005 |

OTHER PUBLICATIONS

Japanese Office Action dated Feb. 22, 2011, issued in corresponding Japanese Patent Application No. 2010-290481.

International Search Report mailed May 2, 2006, issued in corresponding International Application No. PCT/JP2006/300910.

* cited by examiner (A)

(B)

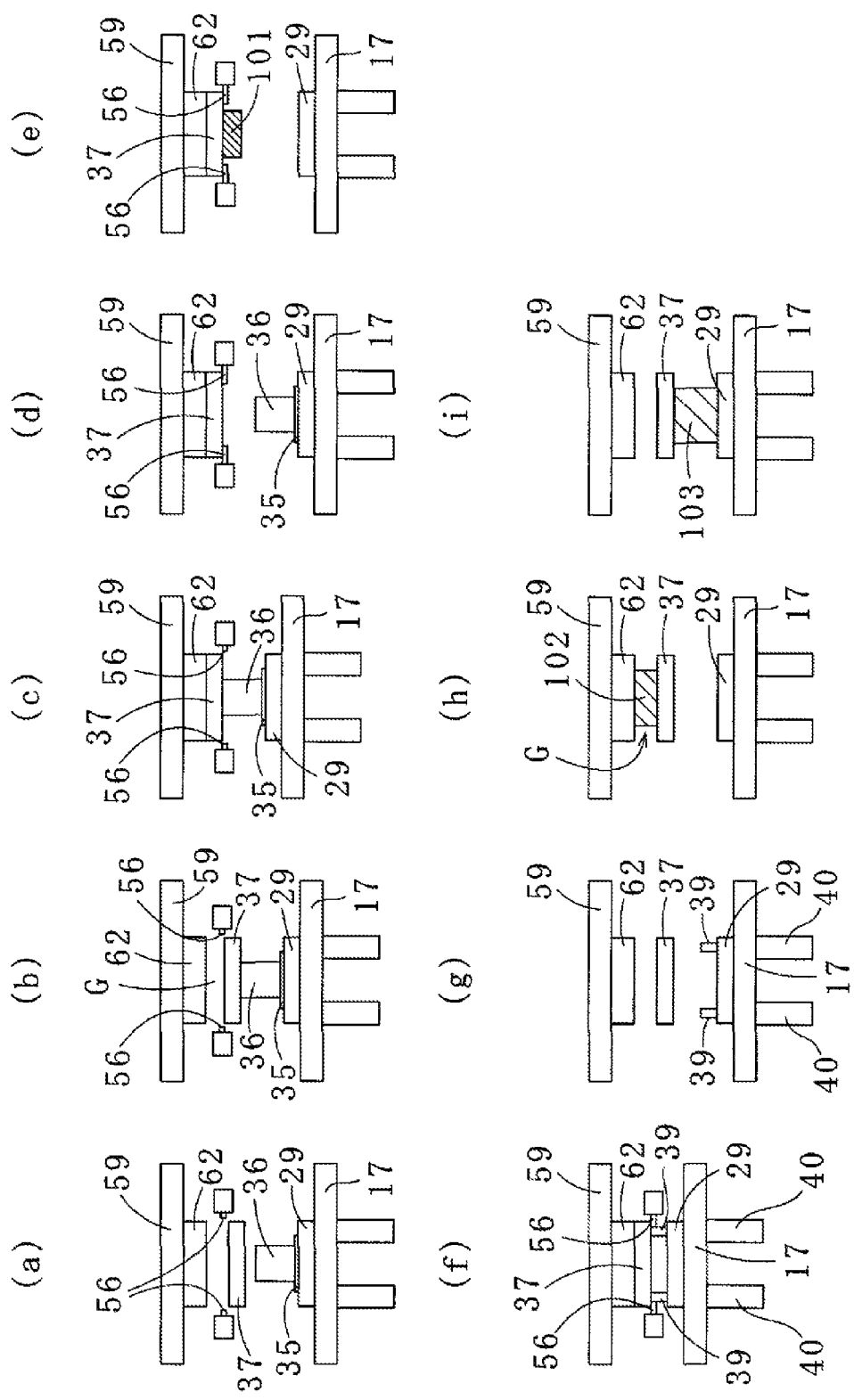

METHOD OF RESIN SEALING PERMANENT MAGNETS IN LAMINATED ROTOR CORE

CROSS-REFERENCE TO RELATED APPLICATION

This application is a continuation of U.S. application Ser. No. 10/584,922, filed on Jun. 29, 2006; which is which is a 371 of International Application No. PCT/JP2006/300910 filed on Jan. 16, 2006, which is based upon and claims the benefit of priority from the prior Japanese Patent Application No. 2005-015860, filed on Jan. 24, 2005, the entire contents of which are incorporated herein by reference.

TECHNICAL FIELD

The present invention relates to a method of resin sealing permanent magnets in a laminated rotor core, by which the permanent magnets inserted in a plurality of magnet insertion holes formed in the laminated core are fixed by injection of resin material into the magnet insertion holes, the laminated core being formed by stacking a plurality of core pieces (including a laminated rotor core having a shaft hole in a center thereof).

BACKGROUND ART

Conventionally, a method for fixing permanent magnets to a laminated core by resin sealing, such as one disclosed in Japanese Patent Application Gazette No. 2002-34187, has been known. The invention disclosed in the Gazette is constructed as follows. That is, core pieces blanked out by a pressing machine to have prescribed shapes are laminated and caulked, thereby forming a laminated core having a plurality of magnet insertion holes and resin injection holes located closer to an axis of the laminated core than the magnet insertion holes, both of the holes penetrating in the axial direction through the laminated core and being in communication with each other via communicating grooves. The laminated core thus formed is placed on a lower die and a permanent magnet is inserted in each of the magnet insertion holes. Subsequently, an upper die having inlets matching the respective resin injection holes and a resin supply hole communicated with the respective inlets is disposed above the laminated core. While the laminated core is pressed by application of a prescribed pressure on the upper die, resin material is injected into the resin injection holes of the laminated core from the inlets of the upper die. The resin material ejected from the resin injection holes is filled in the magnet insertion holes via the communicating grooves, and the resin is cured when heated under this condition, thereby fixing the respective permanent magnets in the magnet insertion holes of the laminated core.

The conventional method of resin sealing permanent magnets, however, has the following problems to be solved.

In filling the magnet insertion holes of the laminated core with the resin material, the resin material is injected into the magnet insertion holes through the resin supply hole and the inlets diverging from the resin supply hole formed in the upper die, and subsequently, through the resin injection holes and the communicating grooves of the laminated core. Accordingly, passages of the resin material become long. The long passages of the resin material require a great amount of resin and make it difficult to evenly fill the respective magnet insertion holes with the resin, which causes deterioration in reliability. Furthermore, because of the long passages of the resin, a pump for supplying the resin material is required to have a large supply pressure, and thus equipment becomes expensive.

Furthermore, in the technique disclosed in the above Gazette, the laminated core is fitted in a recess on the lower die and removed from the recess after heating. Such operation requires much time by either manual or mechanical means, and is extremely poor in workability.

The present invention has been made in view of the above situations and aims to provide a method of resin sealing permanent magnets in a laminated rotor core, which excels in productivity and workability and is capable of producing highly reliable products at low cost.

DISCLOSURE OF INVENTION

A method of resin sealing permanent magnets in a laminated rotor core according to the present invention for attaining the above objects (hereafter, simply referred to as a method of resin sealing permanent magnets) comprising: a first step of inserting the permanent magnets respectively in a plurality of magnet insertion holes in the laminated rotor core formed by a stack of a plurality of core pieces; a second step of disposing the laminated rotor core between a lower die and an upper die, the lower die being provided for placing the laminated rotor core thereon, the upper die pairing with the lower die and having resin reservoir pots; a third step of pressing and heating the laminated rotor core by the upper die and the lower die while heating and liquefying raw resin material put in the resin reservoir pots by the upper die; and a fourth step of filling the magnet insertion holes of the laminated rotor core with the liquefied resin material from the upper die by ejecting the liquefied resin material from the resin reservoir pots by plungers, the plunger being inserted and moving vertically in the resin reservoir pots.

In the method of resin sealing permanent magnets according to the present invention, the filling of the magnet insertion holes with the liquefied resin material in the fourth step means to fill the magnet insertion holes by injecting the liquefied resin material directly into the upper ends of the magnet insertion holes from the upper die without, for example, resin injection holes or communicating grooves provided to the laminated rotor core. The upper die includes members in direct contact with an upper surface of the laminated rotor core (e.g., an upper-die auxiliary block).

In the method of resin sealing permanent magnets according to the present invention, it is preferable that the resin reservoir pots provided in the upper die vertically penetrate the upper die. Accordingly, when the upper die is elevated and detached from the upper surface of the laminated rotor core after resin sealing of the permanent magnets in the laminated rotor core, the resin material remained and cured in the resin reservoir pots comes out of the pots and adheres to the upper surface of the laminated rotor core. This makes cleaning of the resin reservoir pots easy. Moreover, the resin material adhered to the upper surface of the laminated rotor core can be removed with ease by application of load from a horizontal direction.

In the present invention, the resin material may be a thermosetting resin or a thermoplastic resin. When the thermosetting resin is used, the resin needs to be cured by heating the laminated core after being injected into the magnet insertion holes. The laminated core is preferably heated, for example, by heating means provided to the upper and the lower dies.

In the method of resin sealing permanent magnets according to the present invention, it is preferable that the laminated rotor core has a shaft hole in a center thereof, and the laminated rotor core is disposed between the upper die and the lower die in a state that the laminated rotor core is placed on a carrier tray having a guide member fitted in the shaft hole of the laminated rotor core.

Thereby, the laminated core can be precisely positioned on the carrier tray and accidents such as falling of the laminated core from the carrier tray during transportation can be prevented. In consideration of workability, the guide member is preferably of a diameter expandable/shrinkable type, which allows easy centering of a laminated rotor core formed by e.g., a stack of core pieces not fixed by caulking or an adhesive agent or a stack of thin core pieces of 0.5 mm or less in thickness having weak caulking strength.

The guide member of a diameter fixed type may also be employed, and in this instance, it is preferable that an outside diameter of the guide member is slightly smaller than an inside diameter of the shaft hole of the laminated rotor core.

In either case of employing the guide member of the diameter expandable/shrinkable type or of the diameter fixed type, it is preferable that the carrier tray is provided with lower vent grooves for release of air, the lower vent grooves being respectively in communication with lower ends of the magnet insertion holes. Thereby, the magnet insertion holes can be stably filled with the resin material.

In the method of resin sealing permanent magnets according to the present invention, it is preferable that the filling of the magnet insertion holes with the liquefied resin material is carried out with a difference in level between an upper end of the laminated rotor core and an upper end of each of the permanent magnets. This prevents protrusion of the permanent magnets from the upper end of the laminated rotor core, and the injected resin material spreads entirely around the permanent magnets, thereby firmly fixing the permanent magnets. Furthermore, in this instance, the upper die can be provided with upper vent grooves for release of air, the upper vent grooves being respectively in communication with upper ends of the magnet insertion holes. The upper vent grooves in this instance preferably have an extremely shallow depth to have a configuration that only allows air to be released outside but does not allow the resin material to be released outside.

In the method of resin sealing permanent magnets according to the present invention, it is preferable that the resin material is a thermosetting resin and is thermally cured after being injected into the magnet insertion holes. Because of this, the thermosetting resin will not melt and the permanent magnets will not move even when the laminated rotor core is mounted on devices such as a motor and heat is generated.

In the method of resin sealing permanent magnets according to the present invention, it is preferable that the resin reservoir pots in the upper die are provided at positions different from those of the magnet insertion holes as viewed from a top thereof, and the liquefied resin material is supplied to the magnet insertion holes from the resin reservoir pots through resin passages formed on an undersurface of the upper die. In the case where the liquefied resin material is injected into the magnet insertion holes through the resin passages formed on the undersurface of the upper die, the resin material filled in the resin passages remains on the laminated rotor core when the upper die is elevated, and the remaining resin can be peeled off with ease.

In the method of resin sealing permanent magnets according to the present invention, it is preferable that the respective resin reservoir pots are provided in an area (region) radially inward of the positions of the corresponding magnet insertion holes with respect to an axis of the laminated rotor core as viewed from a top thereof. In general, because of the structure of the laminated rotor core, the magnet insertion holes are provided radially outward in the laminated rotor core, and thus flat parts are formed on an upper surface of the laminated rotor core between the shaft hole and the magnet insertion holes. Therefore, when the resin reservoir pots are disposed directly on the flat parts, the flat parts may be utilized as bottoms of the resin reservoir pots.

The laminated rotor core disposed between the upper and the lower dies in the second step is preferably preheated to a prescribed temperature (e.g., about 170° C., more concretely, 165 to 175° C.) by a preheating unit disposed separately. Moreover, the laminated rotor core disposed between the upper and the lower dies is preferably heated by a high-frequency induction heating coil, which constitutes a part of an induction heating means, provided on a side of the laminated rotor core so that decrease in temperature is prevented as much as possible. These treatments shorten the resin sealing time of the permanent magnets in the laminated rotor core.

BRIEF DESCRIPTION OF DRAWINGS

FIG. 8 is an explanatory diagram of the method of resin sealing permanent magnets in a laminated rotor core using the resin sealing apparatus.

BEST MODE FOR CARRYING OUT THE INVENTION

Next, referring to the accompanying drawings, one embodiment of the present invention is explained. First, a resin sealing apparatus used to implement a method of resin sealing permanent magnets in a laminated rotor core according to the one embodiment of the present invention is explained.

Figure 4:
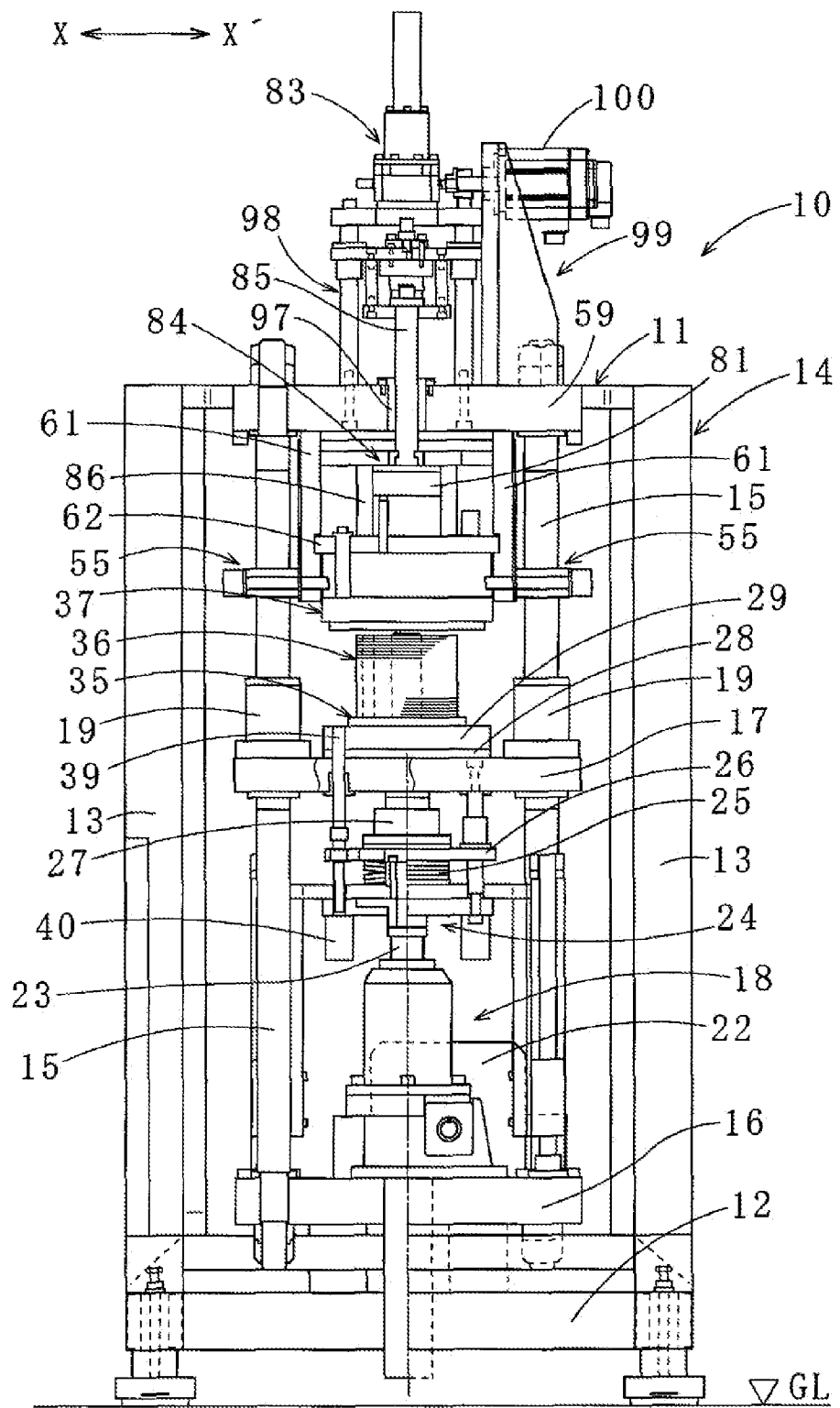
FIG. 4 is a front view showing an entire structure of the resin sealing apparatus.

As shown in FIG. 4, a resin sealing apparatus 10 includes a mount 14 having four column members 13 whose upper sides and lower sides are respectively coupled by upper and lower coupling members 11, 12; four guideposts 15 provided inside the mount 14, each of the guideposts 15 being fixed to upper and lower sides of the mount 14 to stand upright; a lower stationary member 16 fixed to lower portions of the guideposts 15; a lower-die support member 17 vertically movably disposed in middle portions of the guideposts 15; and a worm jack 18 which is one example of a lifting means for lifting and lowering the lower-die support member 17.

Figure 1:
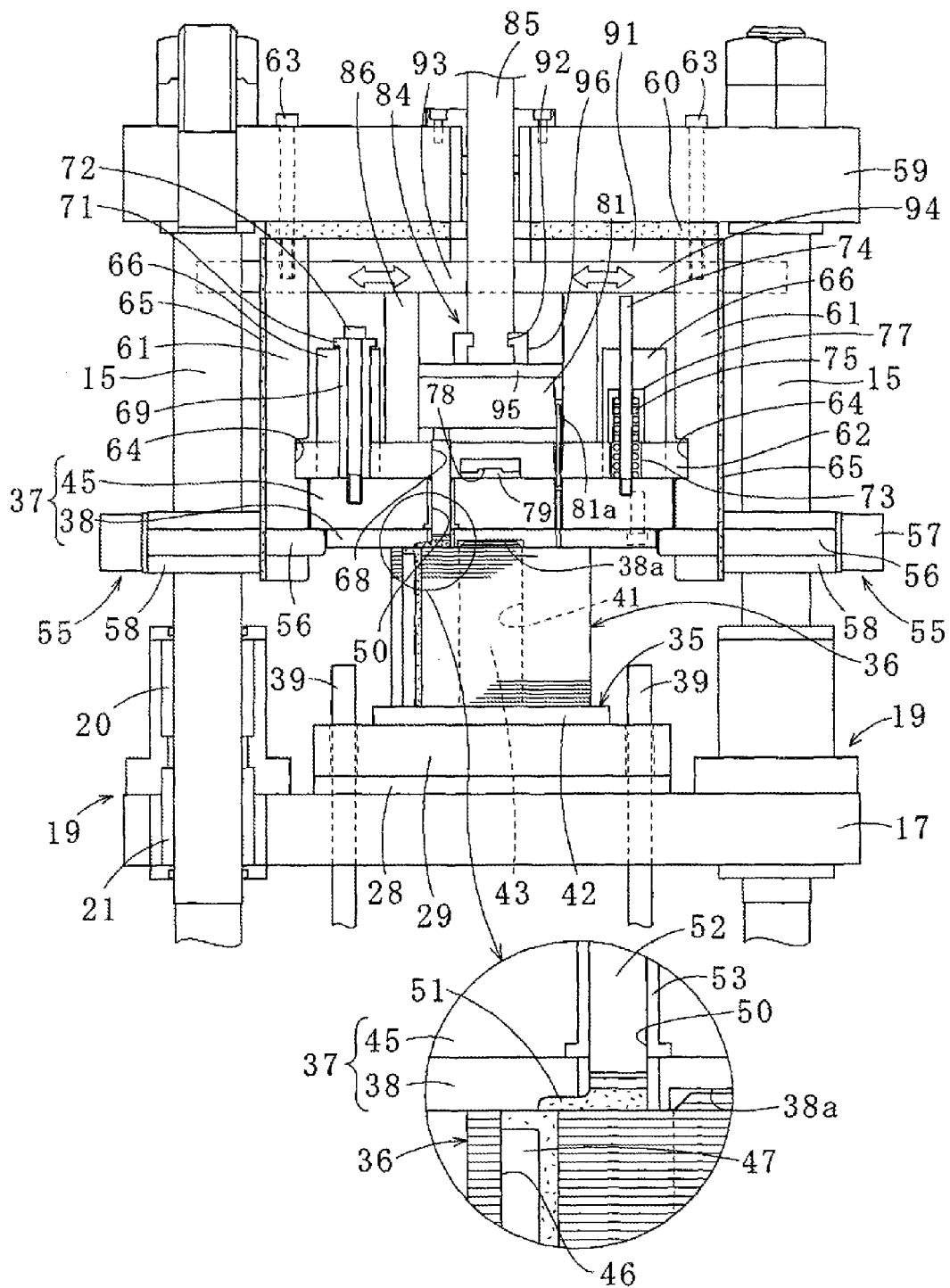
FIG. 1 is a partly omitted front view of a resin sealing apparatus used in a method of resin sealing permanent magnets in a laminated rotor core according to one embodiment of the present invention.
Figure 2:
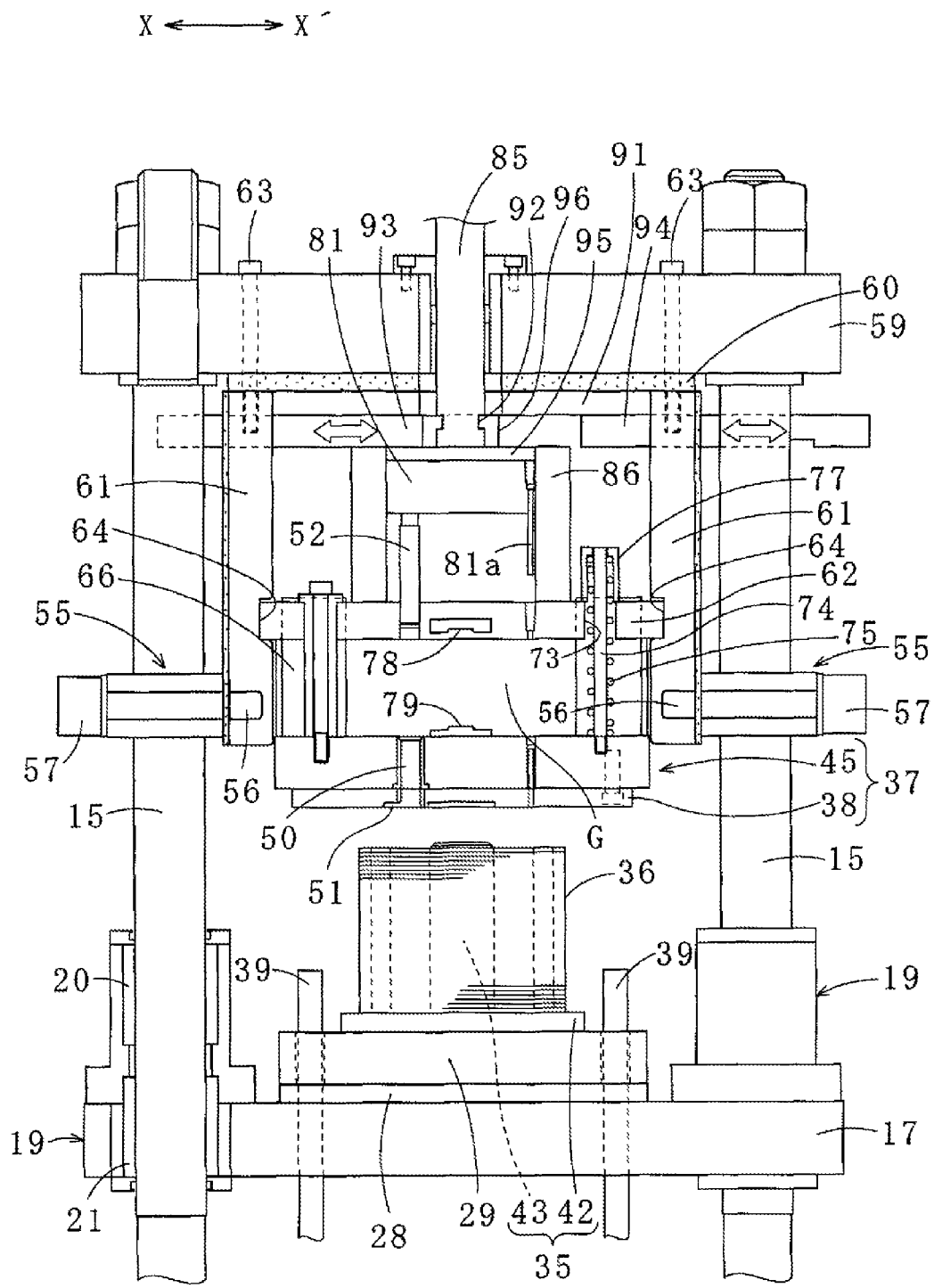
FIG. 2 is a partly omitted front view of the resin sealing apparatus with a lower die lowered.

Four corners of the lower-die support member 17 are fixed by sliding bearings 19 which are vertically movably attached to the respective four guideposts 15 having a circular cross section. As shown in FIGS. 1 and 2, the respective sliding bearings 19 have bearing metals 20, 21 provided therein to move up and down smoothly on the guideposts 15.

The worm jack 18 is driven by a servomotor 22. A vertically movable output shaft 23 of the worm jack 18 is coupled to the lower-die support member 17 via a vertically movable support member 24, a plurality of disc springs 25 for reducing impact load, a middle plate 26, and a load cell 27 which is one example of load sensors. Accordingly, the worm jack 18 allows the lower-die support member 17 to move up and down along with the support member 24, the plurality of disc springs 25, the middle plate 26 and the load cell 27.

Figure 5:
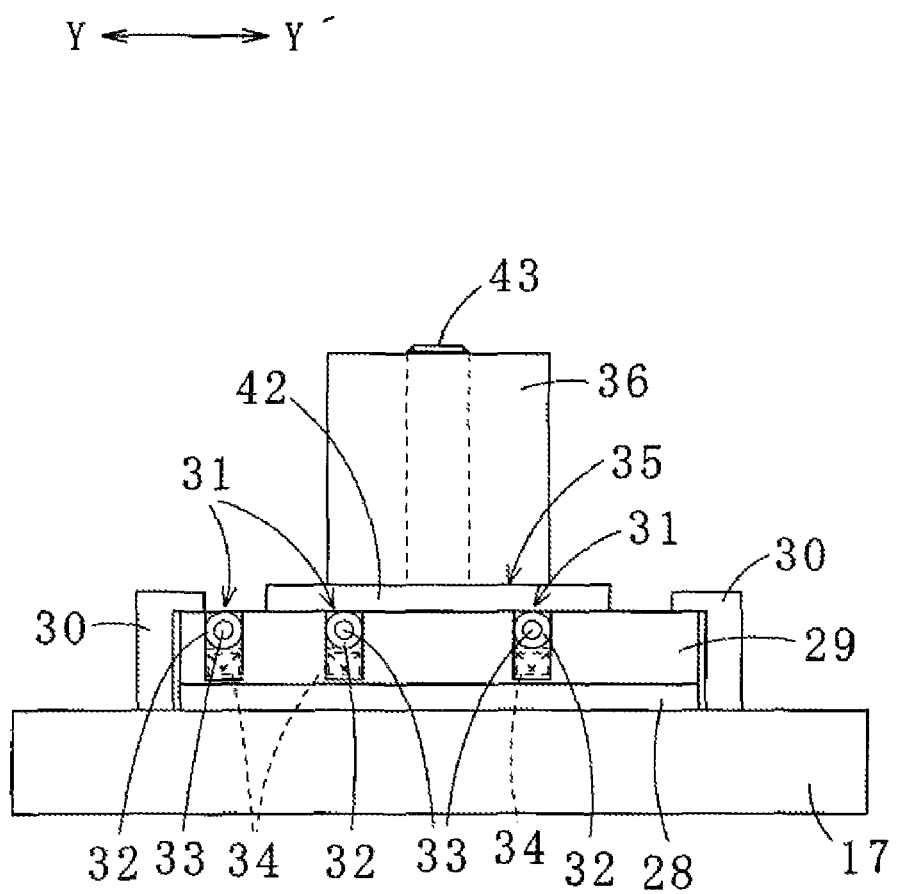
FIG. 5 is a partly omitted side view showing the lower die of the resin sealing apparatus and the vicinity thereof.

A lower die 29 is placed over the lower-die support member 17 via a heat insulating plate 28. As shown in FIG. 5, the lower die 29 and the heat insulating plate 28 are detachably fixed on the lower-die support member 17 by attachment fittings 30. A plurality of grooves 31 are provided in the lower die 29, and a roller 32 is disposed in each upper portion of the grooves 31 in such a manner that a mounting shaft 33 of the roller 32 is pressed from below by a spring 34. The rollers 32 are partly protruded from an upper surface of the lower die 29 in a natural state, and allow a carrier tray 35 on which a laminated rotor core 36 is placed to roll and move on the lower die 29. A heater not shown which is one example of a heating means is provided inside the lower die 29 to heat the laminated rotor core 36 placed on the carrier tray 35. As shown in FIGS. 5 and 1, strength of the springs 34 is adjusted so that the springs 34 are shrunk to bring the carrier tray 35 on which the laminated rotor core 36 is placed into contact with the lower die 29 when the lower die 29 is elevated by operating the worm jack 18 and an upper end of the laminated rotor core 36 is brought into contact with an upper-die auxiliary block 38, i.e., a part of an upper die 37 located over the laminated rotor core 36. A distal end of a guide member 43 projecting from the upper end of the laminated rotor core 36 is to be inserted in a depression 38a which is formed in a central bottom portion of the upper-die auxiliary block 38.

As shown in FIGS. 1, 2 and 4, guide rods 39 penetrate four corner portions of the lower die 29, the heat insulating plate 28 and the lower-die support member 17. Air cylinders 40 provided in the support member 24 are respectively disposed at lower ends of the guide rods 39. If necessary, the guide rods 39 are elevated to support the upper die 37.

As shown in FIG. 5, the attachment fittings 30 are disposed at both sides in a horizontal direction, i.e., width direction (X-X' direction) of both end portions in an anteroposterior direction (Y-Y' direction) of the lower die 29 to fix the lower die 29 to the lower-die support member 17. The attachment fittings 30 are not shown in FIGS. 1, 2 and 4.

Figure 3:
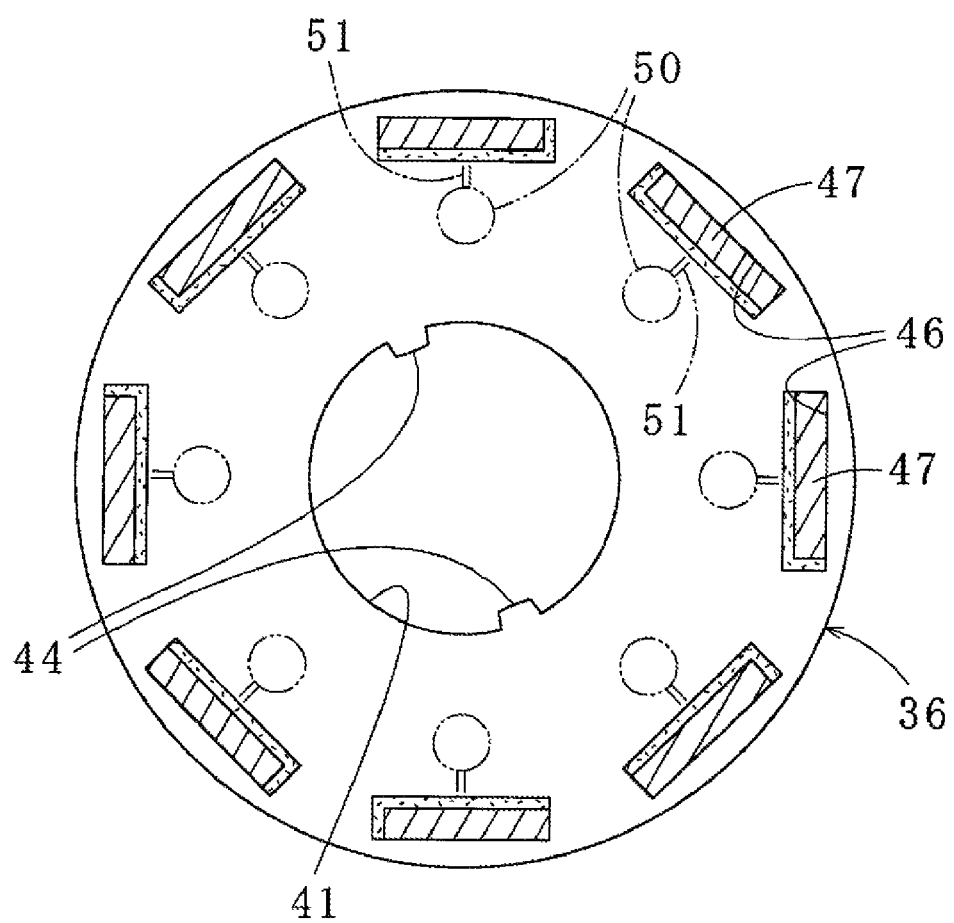
FIG. 3 is a plan view of the laminated rotor core shown overlapped with resin reservoir pots and resin passages connected to the pots.

The carrier tray 35 is provided to hold the laminated rotor core 36, and includes a receiving plate 42, each side of which is longer than an outside diameter of the laminated rotor core 36, and the guide member 43 provided in a center of the receiving plate 42. The guide member 43 has a diameter that expands or shrinks slightly by an elastic member not shown such as a spring, a total length slightly longer (e.g., by about 1 to 5 mm) than that of the laminated rotor core 36, and an upper end portion processed to be in a conical shape (i.e., a periphery of the upper end portion chamfered). Having such structure, the guide member 43 can be easily inserted in a shaft hole 41 of the laminated rotor core 36. As shown in FIG. 3, mutually facing projections 44 for stopping rotation are formed inside the shaft hole 41 of the laminated rotor core 36. Alternatively, the guide member 43 may be of a diameter fixed type. In this case, it is preferable that an outside diameter of the guide member 43 is slightly less (e.g., by 2 to 30 µm) than an inside diameter of the shaft hole 41 of the laminated rotor core 36.

As shown in FIGS. 1 and 2, the laminated rotor core 36, which is produced by laminating a predetermined number of core pieces previously blanked out by a pressing machine (not shown) having a well-known structure, is placed on the carrier tray 35. Immediately above the laminated rotor core 36, there are provided an upper-die main body 45 which is a part of the above-described upper die 37, and the upper-die auxiliary block 38 (also called as a cavity block) which is screwed onto a lower portion of the upper-die main body 45 and is slightly smaller than the upper-die main body 45 in width. As shown in FIG. 3, the laminated rotor core 36 has a plurality (eight in the present embodiment) of magnet insertion holes 46 having a rectangular cross section provided in an outer peripheral portion thereof, and permanent magnets 47 having cross-sectional dimensions slightly smaller (e.g., by 20 to 500 µm per side) than those of the magnet insertion holes 46 are inserted in the magnet insertion holes 46, respectively.

As shown in a partly enlarged view of FIG. 1 and by a double-dot-dashed line in FIG. 3, the upper die 37 placed immediately above the laminated rotor core 36 includes resin reservoir pots 50 circular in cross section respectively corresponding to the magnet insertion holes 46, and resin passages 51 (generally called as runners) respectively connected to the resin reservoir pots 50 for leading a liquefied resin material from the pots 50 to the magnet insertion holes 46. Each of the resin reservoir pots 50 penetrates the upper-die main body 45 and the upper-die auxiliary block 38 which are vertically stacked to constitute the upper die 37. The each of the resin reservoir pots 50 of the upper-die main body 45 is provided with a bushing 53 to reduce friction with a vertically moving plunger 52 inserted in the each of the pots 50. A heater not shown, which is one example of a heating means, is installed in the upper-die main body 45. The heater heats and melts raw material of the resin material (a thermosetting resin, more specifically an epoxy resin, is used in the present embodiment) in a tablet form put into the resin reservoir pots 50 from above. After the liquefied resin material is injected into the magnet insertion holes 46 of the laminated rotor core 36, the heater further heats the laminated rotor core 36 to cure the resin material. The resin reservoir pots 50 vertically penetrate the upper die 37, i.e., to a lower end of the upper-die auxiliary block 38, and the resin passages 51 are provided in the upper-die auxiliary block 38.

Stopper mechanisms 55 for fixing the upper die 37 to the guideposts 15 at a predetermined height are respectively provided on the guideposts 15. Each of the stopper mechanisms 55 includes a stopper rod 56, a pneumatic cylinder 57 for advancing and withdrawing the stopper rod 56, and an attachment fitting 58 for fixing a guide member of the stopper rod 56 and the pneumatic cylinder 57 to the each guidepost 15. Advance limit of the mutually facing stopper rods 56 is set, as shown in FIG. 1, so that intervals between distal ends of the stopper rods 56 at both sides become shorter than a width of the upper-die main body 45 but longer than a width of the upper-die auxiliary block 38. According to the structure, the upper die 37 in the upper limit position can be prevented from moving downward by activating the stopper mechanisms 55.

As shown in FIG. 2, a middle stationary plate 62 is provided over the upper die 37. The middle stationary plate 62 is supported by four hanging fittings 61 at both sides whose upper ends are respectively fixed by bolts 63 to a lower portion of an upper stationary plate 59 via a heat insulating plate 60. The upper stationary plate 59 is a part of the upper coupling member 11, and couples upper potions of the four guideposts 15. Namely, the middle stationary plate 62 is held at predetermined height in a state that both end portions thereof are fitted in engagement grooves 64 comprising cutouts formed respectively in middle portions of the hanging fittings 61. Heat insulating plates 65 are respectively provided on outer sides of the hanging fittings 61.

Figure 6:
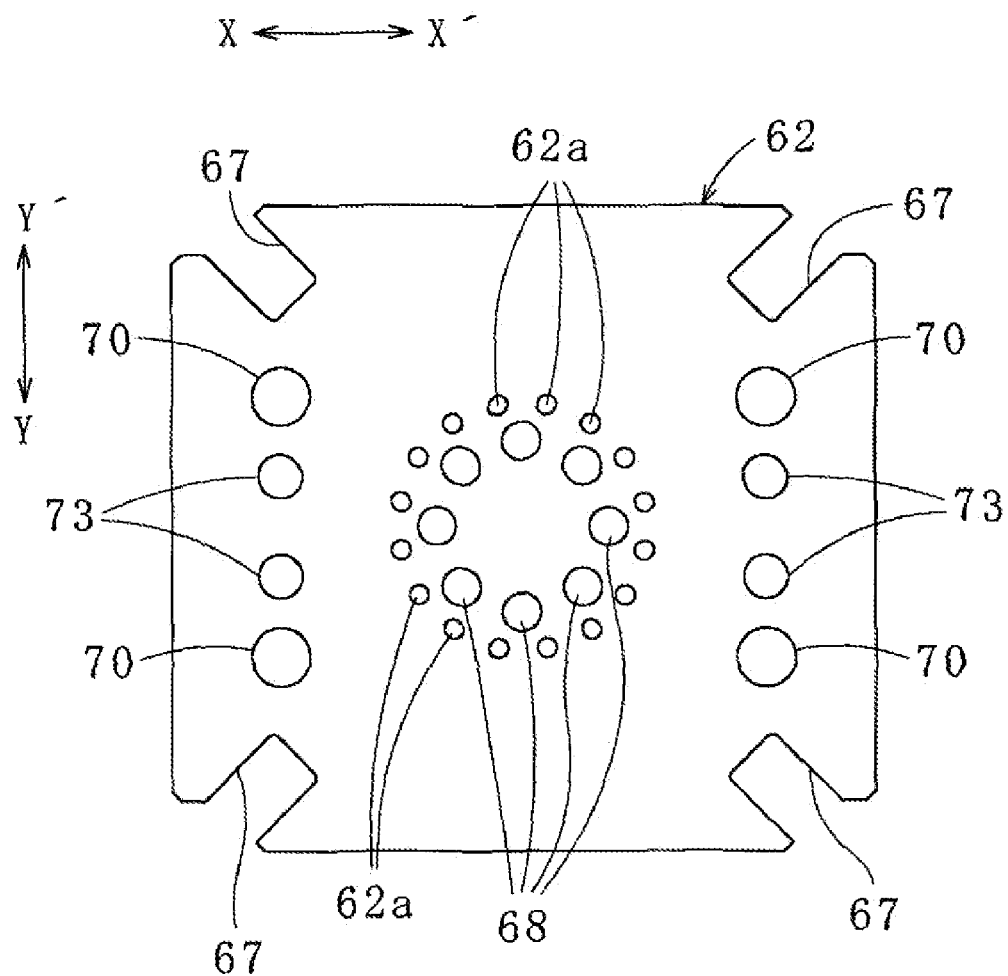
FIG. 6 is a plan view of a middle stationary plate used in the resin sealing apparatus.

FIG. 6 shows the details of the middle stationary plate 62 having a substantially rectangular shape when viewed from a top thereof, and radially disposed cutouts 67 are respectively formed on four corners of the middle stationary plate 62. Vertical guides 66 having a rectangular cross-section and vertically disposed on the four corners of the upper die 37 are vertically movably inserted in the cutouts 67. In a central position of the middle stationary plate 62, there are provided plunger guide holes 68 precisely conforming to the respective eight resin reservoir pots 50 formed in the upper die 37. In the middle stationary plate 62, through-holes 70 having a circular cross section are provided radially outward of the plunger guide holes 68. Four guide tubes 69 for positioning which are vertically disposed on the upper die 37 penetrate the through-holes 70. The four guide tubes 69 respectively have stopper flanges 71 provided in upper portions thereof, and are fixed to the upper-die main body 45 constituting the upper die 37 by long bolts 72.

Spring insertion holes 73 are disposed between each of front and rear pairs of the through-holes 70 disposed at both sides in the X-X' direction of the middle stationary plate 62. Coil springs 75 are fixed to an upper potion of the upper-die main body 45 by guide rods 74 whose lower portions are screwed to the upper-die main body 45, and inserted in the spring insertion holes 73 with sufficient clearance between the coil springs 75 and the holes 73. Spring retaining caps 77 for retaining upper ends of the coil springs 75, in which upper potions of the coil springs 75 are inserted, are disposed over the respective spring insertion holes 73. Accordingly, the coil springs 75 in a shrunken state are housed in the spring insertion holes 73 and the spring retaining caps 77, thereby allowing the elevated upper-die main body 45 to come into close contact with the middle stationary plate 62. As shown in FIG. 2, when the lower-die support member 17 is lowered by operating the worm jack 18, space G is formed between the upper die 37 and the middle stationary plate 62. Thus, the raw resin material (generally in a tablet form) can be put in the resin reservoir pots 50 by a material supply unit not shown or by manual.

A concave portion 78 for alignment is provided in a lower central portion of the middle stationary plate 62, and precisely matches a convex portion 79 for alignment provided in a central portion of an upper surface of the upper-die main body 45. Accordingly, the plunger guide holes 68 and the resin reservoir pots 50 are precisely aligned.

A plunger holder 81 for supporting the plungers 52 which force the resin material out of the eight resin reservoir pots 50 is provided over the middle stationary plate 62. As shown in FIGS. 1 and 4, the plunger holder 81 is connected via a coupling mechanism 84 to a shank 85 driven up and down by a warm jack 83 i.e., one example of a lifting means, and the plunger holder 81 can be elevated and lowered by operation of the worm jack 83. A cylindrical holder guide 86 for guiding the plunger holder 81 is fixed on the middle stationary plate 62.

Figure 7:
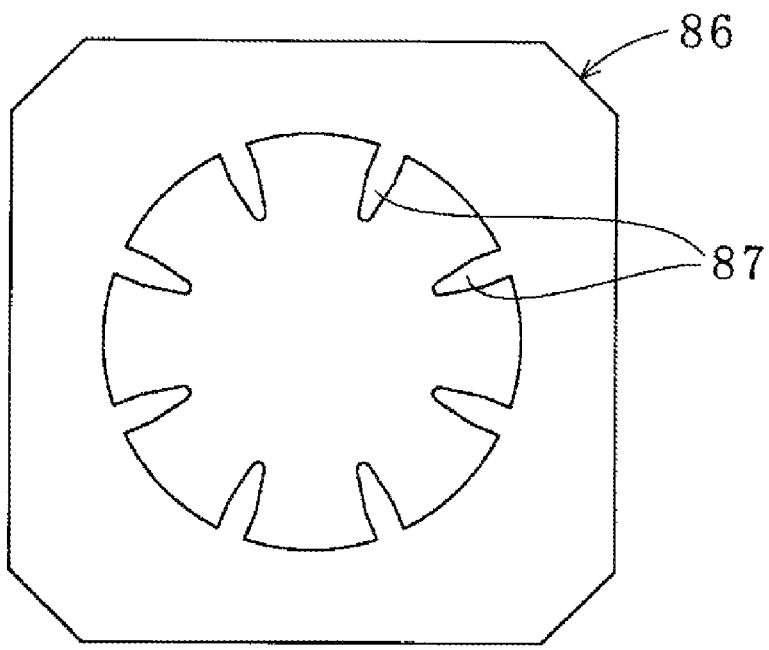
FIG. 7 (A) and (B) are plan views of a holder guide and a plunger holder, respectively.
Figure 7:
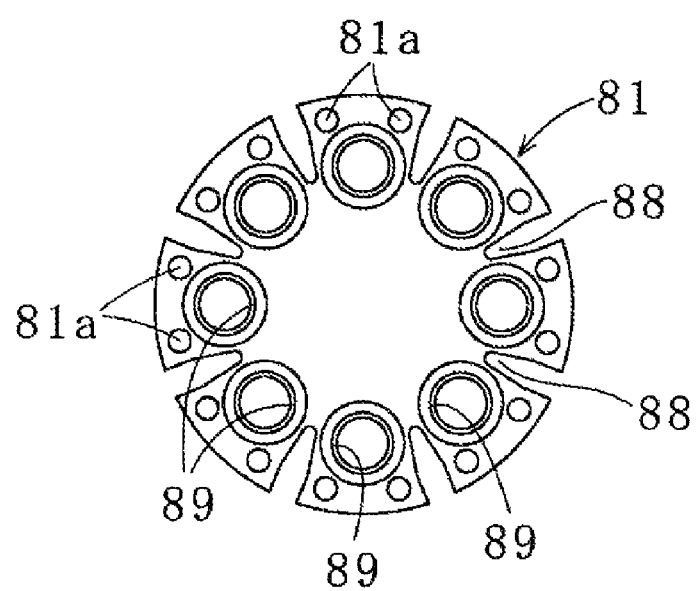

As shown in FIGS. 7 (A) and (B), the holder guide 86 has a plurality of projections 87 inside, and the plunger holder 81 has guide grooves 88 in which the projections 87 are inserted. The plunger holder 81 has an outside diameter less than an inside diameter of a portion of the holder guide 86 excluding the projections 87 so that the plunger holder 81 expanded in diameter by thermal expansion does not interfere with the inside of the holder guide 86. The plunger holder 81 and the holder guide 86 are aligned by inserting the projections 87 of the holder guide 86 in the guide grooves 88 of the plunger holder 81.

The eight plungers 52 are perpendicularly attached to the plunger holder 81 by a screw connection, and can be replaced if necessary. Numerals 89 in FIG. 7 (B) show female screws in which the plungers 52 are screwed.

A horizontal guide plate 91 is secured right below the upper stationary plate 59 through the heat insulating plate 60 by screws not shown. Spacing plates 93, 94 which are movable in the horizontal direction (X-X' direction) centering the shank 85 are disposed between the horizontal guide plate 91 and the upper end of the holder guide 86. The coupling mechanism 84 for connecting the shank 85 and the plunger holder 81 includes an engaging portion 92 formed in a lower portion of the shank 85, an auxiliary plate 95 fixed to an upper portion of the plunger holder 81 and having the same planar shape as that of the plunger holder 81, and a connecting portion 96 fixedly secured to the auxiliary plate 95 and engaged with the engaging portion 92. The engaging portion 92 comprises an annular groove provided in the lower portion of the shank 85, and the connecting potion 96 comprises a fitting having a horseshoe inner projection to be fitted in the annular groove from a specified direction (for example, the horizontal direction). When fixing of the auxiliary plate 95 to the plunger holder 81 is released and the auxiliary plate 95 is pulled in a specified outward direction with the spacing plates 93, 94 pulled outward, the plunger holder 81 can be separated from the shank 85.

As shown in FIGS. 1, 2 and 7 (B), 16 protruding pins 81*a* are disposed in the periphery of the plunger holder 81, and the auxiliary plate 95 prevents upper ends of the protruding pins 81*a* from coming out of the plunger holder 81 upward. The protruding pins 81*a* thus fixed to the plunger holder 81 penetrate pin through-holes 62*a* of the middle stationary plate 62 as shown in FIG. 6 and through-holes provided in the upper die 37, thereby pressing the upper end portion of the laminated rotor core 36 located immediately below the upper die 37. Such structure allows the laminated rotor core 36 which is finally resin-sealed to be detached from the upper die 37 (the upper-die auxiliary block 38 in particular).

As shown in FIG. 4, the shank 85 vertically movably penetrates a center of the upper stationary plate 59 via a sliding bearing 97, and the worm jack 83 secured by a support member 98 is connected to an upper end of the shank 85. The worm jack 83 is driven by a servomotor 100 sustained by a support member 99.

Next, with reference to FIGS. 1 to 4, the method of resin sealing permanent magnets in a laminated rotor core according to the one embodiment of the present invention using the resin sealing apparatus 10 is explained following procedures shown in FIG. 8 (*a*) to (*i*).

(a) The predetermined number of core pieces having a predetermined shape (as shown in FIG. 3) are laminated to produce the laminated rotor core 36 having the plurality (eight in the present embodiment) of the magnet insertion holes 46 formed in the periphery thereof. The laminated rotor core 36 is placed on the carrier tray 35, and the prescribed permanent magnets 47 are put respectively into the magnet insertion holes 46. The laminated rotor core 36 set on the carrier tray 35 is placed on the lower die 29 by a conveying means etc. not shown, and an axis of the laminated rotor core 36 is aligned with that of the upper die 37. (Supply of the laminated rotor core)

Preferably, the laminated rotor core 36 is preheated to, for example, around 170° C. by a preheating unit (for example, a heating furnace) equipped in the previous step.

(b) The worm jack 18 is driven to slightly elevate the lower-die support member 17, the lower die 29 and the laminated rotor core 36 placed thereon, thereby bringing the laminated rotor core 36 into close contact with the upper die 37. More specifically, the laminated rotor core 36 comes into contact with an undersurface of the upper-die auxiliary block 38, and the distal end of the guide member 43 protruding from a central portion of the upper surface of the laminated rotor core 36 is fitted in the depression 38a provided in a central portion of a lower portion of the upper-die auxiliary block 38. At this point, since the space G (about 80 mm high in the embodiment) exists between the upper die 37 and the middle stationary plate 62, the raw material of the thermosetting resin in a predetermined amount (having a tablet form) is put in the respective eight resin reservoir pots 50 having openings at upper portions thereof. Here, the supply of the raw material (raw resin material) may be carried out automatically or manually. Then, the resin material is heated to a temperature in the vicinity of some 170° C. by the heater installed in the upper die 37. (Supply of the tablets)

(c) When viscosity of the resin material is reduced by heating, the lower die 29 is elevated by the worm jack 18 via the lower-die support member 17 so that the laminated rotor core 36 set on the carrier tray 35 is pressed against the upper die 37. Accordingly, the space G between the upper die 37 and the middle stationary plate 62 becomes null. Moreover, the convex portion 79 for alignment provided in the upper portion of the upper die 37 fits in the concave portion 78 formed in the lower portion of the middle stationary plate 62, and the eight plunger guide holes 68 formed in the middle stationary plate 62 are aligned respectively with the eight resin reservoir pots 50 provided in the upper die 37.

Next, when the worm jack 83 in the upper potion of the resin sealing apparatus 10 is driven to lower the plunger holder 81, the eight plungers 52 push the melted resin material (i.e., the thermosetting resin) out of the resin reservoir pots 50, thereby filling the respective magnet insertion holes 46 with the resin material through the resin passages 51.

The heaters in the lower and the upper dies 29, 37 are operated to heat the laminated rotor core 36 at a temperature in the vicinity of about 170° C. for three minutes. This enables curing of the thermosetting resin and fixing of the permanent magnets 47 in the magnet insertion holes 46. In this instance, since the permanent magnets 47 are inserted in the magnet insertion holes 46 with the lower surfaces of the magnets 47 coincided with the lower edges of the holes 46, there is a slight difference in level (e.g., 2 to 20 µm) between an upper end of the laminated rotor core 36 and an upper end of the each permanent magnet 47. Thus, none of top portions of the permanent magnets 47 project from the magnet insertion holes 46, which ensures contact of the upper surface of the laminated rotor core 36 with the upper die 37. Furthermore, the resin material passes through space formed between the upper die 37 and the top portions of the permanent magnets 47, which allows more efficient filling of the magnet insertion holes 46 with the resin material.

Air inside the magnet insertion holes 46 is released outside through upper vent grooves and lower vent grooves for release of air respectively provided on a lower surface of the upper-die auxiliary block 38 and on a surface of the receiving plate 42 of the carrier tray 35. The upper and lower vent grooves have such depth (e.g., 0.2 to 0.6 µm) that allows passage of air but not of the resin material. In this manner, the material of the thermosetting resin is once liquefied by heating, and the resin is filled in the magnet insertion holes 46 from the upper surface of the laminated rotor core 36 via the resin passages 51. As a result, the thermosetting resin is easily put into the magnet insertion holes 46. (Die clamping and resin injection)

(d) Next, as shown in FIG. 1, the stopper mechanisms 55 are actuated to project the four stopper rods 56 so that the stopper rods 56 are brought into contact with lower surfaces of both end portions in the horizontal direction of the upper-die main body 45 in its upper limit position, thereby preventing lowering of the upper die 37. The plunger holder 81 is further pushed downward (e.g., 5 mm) by the worm jack 83 in this state, and the protruding pins 81a are lowered and protruded from the lower end of the upper die 37 to push and detach the laminated rotor core 36 from the upper die 37. As a result, the laminated rotor core 36 is separated from the upper die 37. The resin material remained and cured in the resin reservoir pots 50 of the upper die 37 adheres to the upper surface of the laminated rotor core 36, and thereby lower portions of the resin reservoir pots 50 become empty. (Die opening)

Then, the carrier tray 35 on which the laminated rotor core 36 is placed is detached from the lower die 29, the laminated rotor core 36 is removed from the carrier tray 35, and the carrier tray 35 is conveyed to a subsequent step by a separately arranged conveying means. The resin material remained in the resin reservoir pots 50 and the resin passages 51 is cured and adhered to the upper portion of the laminated rotor core 36. However, the unwanted resin material can be easily removed because the resin passages 51 are narrow, namely, a cross sectional area of the resin passages 51 is small.

(e) The plungers 52 and the resin reservoir pots 50 are cleaned with a cleaner 101 having a brush. (Cleaning of the plungers) Since the resin reservoir pots 50 are empty, cleaning can be carried out easily.

(f) The lower die 29 is elevated by the worm jack 18 via the lower-die support member 17, and at the same time, the air cylinders 40 are driven to elevate the guide rods 39 so that upper ends of the four guide rods 39 support the upper die 37. (Preparation of Upper Die Opening)

(g) After the stopper mechanisms 55 are operated to withdraw the four stopper rods 56, the lower die 29 is lowered by the worm jack 18 via the upper-die support member 17, and at the same time, the upper die 37 is lowered along the guide tubes 69 to be in the initial position (see FIGS. 1 and 2). Then, the lower die 29 is further lowered. (Die opening)

(h) The air cylinders 40 are actuated to lower the four guide rods 39, and the space G between the middle stationary plate 62 and the upper die 37 is cleaned with a cleaner 102 having a brush. (Cleaning of tablet input portions)

(i) The upper die 37 and the lower die 29 are cleaned with a cleaner 103 having upper and lower brushes. (Cleaning of the dies)

Implementation of the present invention is not limited to the above embodiment, and various modifications may be made without departing from the scope or sprit of the present invention. Therefore, the present invention includes any method of resin sealing permanent magnets in a laminated rotor core according to present invention embodied by the combination of a part or all of the above embodiment and modifications. For example, in the present embodiment, the upper die 37 is constituted by the separate upper-die auxiliary block 38 and upper-die main body 45. Alternatively, the upper die 37 may be constituted by one member.

In the present embodiment, the eight magnet insertion holes 46 are provided in the laminated rotor core 36. Alternatively, a different number of the magnet insertion holes 46 may be provided.

Moreover, in the present embodiment, the resin reservoir pots 50 are provided in positions respectively corresponding to the magnet insertion holes 46 of the laminated rotor core 36 and radially inward with respect to the magnet insertion holes 46. However, the present invention includes a case where the resin reservoir pots are provided immediately over the magnet insertion holes or the resin reservoir pots partly overlap the magnet insertion holes.

In the present invention, the vent grooves are formed on the upper surface of the receiving plate 42 of the carrier tray 35 and the undersurface of the upper-die auxiliary block 38, both of which come in direct contact with the laminated rotor core 36. Alternatively, the vent grooves on either one or both of the receiving plate 42 and the upper-die auxiliary block 38 may be omitted if required.

In the present embodiment, the respective plungers 52 are screwed to the plunger holder 81 directly. Alternatively, springs may be provided in intermediate positions of the respective plungers 52.

Although the thermosetting resin is used as the resin material in the present embodiment, the present invention is not limited thereto. Alternatively, a thermoplastic resin may be used when the laminated rotor core is used in a motor with a low heat generation.

Furthermore in the present invention, an induction heating coil may be disposed in the vicinity of the laminated rotor core 36 placed between the lower and upper dies 29, 37, and electric power is supplied to the induction heating coil from a high-frequency power source installed separately, thereby heating the laminated rotor core 36. This enables reduction in time of resin sealing the permanent magnets in the laminated rotor core. The induction heating coil and the high-frequency power source constitute an induction heating means.

INDUSTRIAL APPLICABILITY

As evidenced by the above explanation, in the method of resin sealing permanent magnets in a laminated rotor core according to the present invention, the upper die is brought into contact with the magnet insertion holes provided in the laminated rotor core, and the resin material is filled in the magnet insertion holes directly from specified resin reservoir pots provided in the upper die. Thus, the respective magnet insertion holes can be filled with the resin material evenly, and accordingly highly reliable products can be provided.

Furthermore, since it is not necessary to put the resin material into extra portions of the laminated rotor core, waste of the resin material can be reduced. As a result, utilization efficiency of the core is improved, and more efficient motors or generators can be provided.

Particularly, in a case the resin reservoir pots provided in the upper die vertically penetrate the upper die, the resin material can be injected into the magnet insertion holes directly by putting the resin material in the resin reservoir pots, melting, and pressing the resin material by the plungers. After the resin material is cured, the resin material remained in the resin reservoir pots can be removed with ease by detaching the upper die from the laminated rotor core.

The invention claimed is:

1. A method of resin sealing permanent magnets in a laminated rotor core comprising:
   a first step of inserting the permanent magnets respectively in a plurality of magnet insertion holes in the laminated rotor core formed by a stack of a plurality of core pieces;
   a second step of disposing the laminated rotor core between a lower die and an upper die, the lower die being provided for placing the laminated rotor core thereon, the upper die pairing with the lower die and having resin reservoir pots;
   a third step of pressing directly and heating the laminated rotor core by the upper die and the lower die while heating and liquefying raw resin material put in the resin reservoir pots by the upper die; and
   a fourth step of filling the magnet insertion holes of the laminated rotor core with the liquefied resin material from the upper die by ejecting the liquefied resin material from the resin reservoir pots by plungers, the plunger being inserted and moving vertically in the resin reservoir pots,
   wherein the resin reservoir pots provided in the upper die vertically penetrate the upper die, and
   wherein the resin reservoir pots in the upper die are provided immediately over the magnet insertion holes or the resin reservoir pots partly overlap the magnet insertion holes as viewed from a top thereof, and the liquefied resin material is supplied to the magnet insertion holes from the resin reservoir pots.

2. The method of resin sealing permanent magnets in a laminated rotor core as defined in claim 1, wherein the laminated rotor core has a shaft hole in a center thereof, and the laminated rotor core is disposed between the upper die and the lower die in a state that the laminated rotor core is placed on a carrier tray having a guide member fitted in the shaft hole of the laminated rotor core.

3. The method of resin sealing permanent magnets in a laminated rotor core as defined in claim 2, wherein the carrier tray is provided with lower vent grooves for release of air, the lower vent grooves being respectively in communication with lower ends of the magnet insertion holes.

4. The method of resin sealing permanent magnets in a laminated rotor core as defined in claim 1, wherein the filling of the magnet insertion holes with the liquefied resin material is carried out with a difference in level between an upper end of the laminated rotor core and an upper end of each of the permanent magnets.

5. The method of resin sealing permanent magnets in a laminated rotor core as defined in claim 1, wherein the laminated rotor core disposed between the upper die and the lower die in the second step is preheated.

6. The method of resin sealing permanent magnets in a laminated rotor core as defined in claim 1, wherein the laminated rotor core mounted on the lower die is heated from outside by an induction heating means.

* * * * *